(12) United States Patent
Heatlie

(10) Patent No.: US 6,633,876 B1
(45) Date of Patent: Oct. 14, 2003

(54) ANALYZING POST-MORTEM INFORMATION ON A REMOTE COMPUTER SYSTEM USING A DOWNLOADABLE CODE MODULE

(75) Inventor: Walter T. Heatlie, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 587 days.

(21) Appl. No.: 09/589,614

(22) Filed: Jun. 7, 2000

(51) Int. Cl.[7] .......................... G06F 17/30; G01R 31/28
(52) U.S. Cl. .............................. 707/10; 707/9; 714/57; 717/128
(58) Field of Search ............................ 707/1, 10, 200, 707/9; 714/15, 100, 25, 20, 31, 39, 57, 47; 709/216, 217, 224; 717/124, 127, 128

(56) References Cited

U.S. PATENT DOCUMENTS

| | | | | |
|---|---|---|---|---|
| 5,157,667 A | * | 10/1992 | Carusone, Jr. et al. | 714/45 |
| 5,339,406 A | * | 8/1994 | Carney et al. | 714/45 |
| 5,790,777 A | * | 8/1998 | Izuta et al. | 714/45 |
| 6,065,046 A | * | 5/2000 | Feinberg et al. | 709/216 |
| 6,163,858 A | * | 12/2000 | Bodamer | 714/34 |
| 6,202,199 B1 | * | 3/2001 | Wygodny et al. | 717/4 |
| 6,324,644 B1 | * | 11/2001 | Rakavy et al. | 713/1 |
| 6,367,035 B1 | * | 4/2002 | White | 714/40 |
| 6,477,667 B1 | * | 11/2002 | Levi et al. | 714/57 |

\* cited by examiner

*Primary Examiner*—Uyen Le
(74) *Attorney, Agent, or Firm*—Park, Vaughan & Fleming LLP

(57) ABSTRACT

One embodiment of the present invention provides a system for analyzing post-mortem information specifying a state of the remote computer system after the failure of the remote computer system. The system operates by receiving a code module sent from a debugging computer system at the remote computer system. The remote computer system executes the code module, and allows the executing code module to read the post-mortem information from the remote computer system. The remote computer system also allows the executing code module to generate a result, and returns the result to the debugging computer system. In one embodiment of the present invention, the code module includes platform-independent JAVA byte codes that are executed on a JAVA virtual machine located on the remote computer system. In one embodiment of the present invention, the system allows a user of the remote computer system to specify a security policy for the executing code module.

24 Claims, 3 Drawing Sheets

ANALYZING POST-MORTEM INFORMATION ON A REMOTE COMPUTER SYSTEM USING A DOWNLOADABLE CODE MODULE

BACKGROUND

1. Field of the Invention

The present invention relates to determining the cause of a computer system failures. More particularly, the present invention relates to a method and an apparatus for analyzing post-mortem information from a computer system failure on a remote computer system by downloading a code module that executes on the remote computer system.

2. Related Art

When a computer system crashes an exception handling routine typically saves post-mortem information specifying the state of the computer system after the failure to a crash dump file. This crash dump file typically contains much of the contents of the memory of the computer system immediately after the failure, including the state of various threads and the contents of various buffers. By viewing this crash dump file, an engineer is often able to diagnose the cause of the computer system failure.

As computer systems increase in size and complexity, crash dump files can become large. It is not uncommon for a crash dump file to be as large as one gigabyte. This large size creates logistical problems in bringing the crash dump file and the engineer together. Requiring the engineer to travel to the customer site can be very expensive and can involve long delays, especially if the engineer must travel across the country or between continents.

Alternatively, the crash dump file can be sent to the engineer's computer system. Unfortunately, transmitting a very large file across a computer network can take many hours, if not days. Consequently, it is common for a crash dump file to be copied onto a magnetic tape in order to be mailed to the engineer.

Additional copies of the crash dump file may have to be made if system developers and/or engineers for third party subsystems become involved in the debugging process. It is not uncommon for five or six copies of a crash dump file to be made and distributed to different people during in the debugging process. This process of making additional copies is very time-consuming and takes up a great deal of storage space on the various computer systems that are involved.

Furthermore, security is concern in making a crash dump file available to the engineer or other interested parties. For security reasons, is undesirable to allow anyone to log into the customer computer system in order to view the crash dump file. It is also undesirable to make the crash dump file publicly available because the crash dump file can potentially contain any of the information that is stored on the computer system, such a payroll information or technical trade secrets.

What is needed is a method and an apparatus that allows an engineer and other interested parties to view and manipulate post-mortem information from a computer system failure without the delay and costs involved in transporting the engineer to a remote location, or in transporting a large crash dump file to the engineer.

SUMMARY

One embodiment of the present invention provides a system for analyzing post-mortem information specifying a state of the remote computer system after the failure of the remote computer system. The system operates by receiving a code module sent from a debugging computer system at the remote computer system. The remote computer system executes the code module, and allows the executing code module to read the post-mortem information from the remote computer system. The remote computer system also allows the executing code module to generate a result, and returns the result to the debugging computer system.

In one embodiment of the present invention, the code module includes platform-independent JAVA byte codes that are executed on a JAVA virtual machine located on the remote computer system.

In one embodiment of the present invention, the system allows a user of the remote computer system to specify a security policy for the executing code module.

In one embodiment of the present invention, specifying the security policy includes specifying a file on the remote computer system that can be accessed by the executing code module, and specifying a valid source from which the code module can be accepted.

In one embodiment of the present invention, the post-mortem information includes a crash dump file specifying the state of the remote computer system after the failure of the remote computer system.

In one embodiment of the present invention, the system additionally maintains a log of actions performed by the executing code module.

In one embodiment of the present invention, upon detecting the failure of the remote computer system, the system records post-mortem information for the remote computer system, and notifies a user of the debugging computer system that the remote computer system has failed.

In one embodiment of the present invention, generating the result involves analyzing the post-mortem information in order to determine a cause of the failure of the remote computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
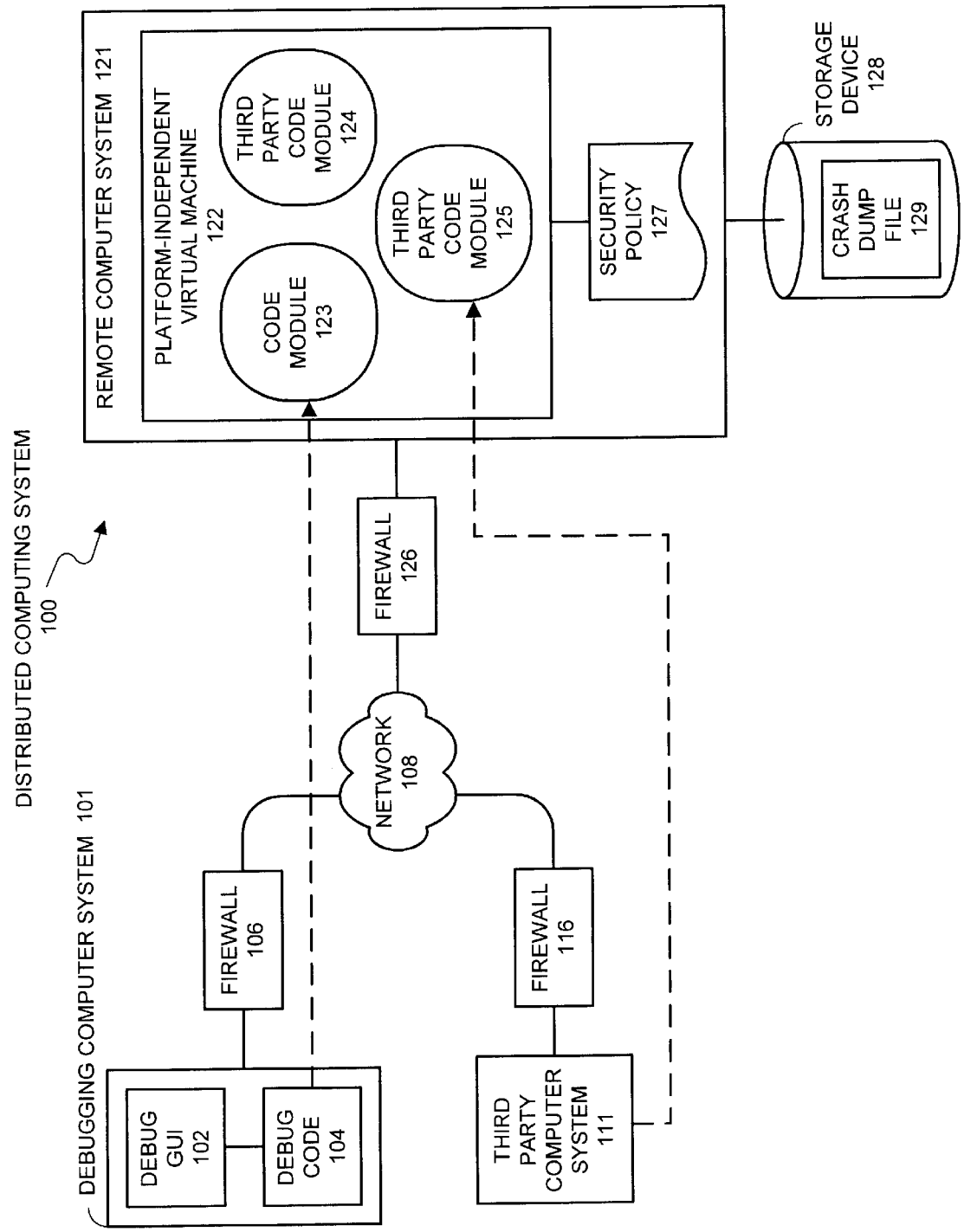
FIG. 1 illustrates a distributed computing system in accordance with an embodiment of the present invention.

FIG. 1 illustrates a distributed computing system 100 in accordance with an embodiment of the present invention. Distributed computing system 100 includes debugging computer system 101, third party computer system 111 and remote computer system 121, which are coupled together by network 108. Computer systems 101, 111 and 121 can generally include any type of computer system, including, but not limited to, a computer system based on a microprocessor, a mainframe computer, a digital signal processor, a personal organizer, a device controller, and a computational engine within an appliance.

Network 108 can include any type of wire or wireless communication channel capable of coupling together computing nodes. This includes, but is not limited to, a local area network, a wide area network, or a combination of networks. In one embodiment of the present invention, network 108 includes the Internet.

Note that computer systems 101, 111 and 121 are coupled to network 108 through firewalls 106, 116 and 126, respectively. Firewalls 106, 116 and 126 can include any mechanism that protects computer systems 101, 111 and 121 from communications across network 108. All communications between computer systems 101, 111 and 121 and network 108 pass through firewalls 106, 116 and 126, respectively. This allows firewalls 106, 116 and 126 to screen these communications for security purposes. Note that firewalls 106, 116 and 126 may be located on independent computer systems, or alternatively, may be integrated into computer systems 101, 111 and 121. Also note that the present invention is not restricted to computer systems that communicate through firewalls.

Debugging computer system 101 contains resources that allow an engineer to debug remote computer system 121. These resources include debug graphical user interface (debug GUI) 102, which receives input from and displays output to the engineer. Debug GUI 102 controls debug code 104, which sends a code module 123 to remote computer system 121. In one embodiment of the present invention, debug code 104 is encapsulated inside a JAVA™ object. (The terms JAVA, JVM and JAVA VIRTUAL MACHINE are trademarks of SUN 25 Microsystems, Inc. of Palo Alto, Calif.).

Third party computer system 111 belongs to a third party that is involved in the debugging process. For example, the failure of remote computer system 121 may involve an operating system interacting with a database. In this case, debugging computer system 101 may be owned by the operating system provider, and third party computer system 111 may be owned by the database provider. Third party computer system 111 sends third party code module 125 to remote computer system 121. This allows third party code module 125 to interact with code module 123 during the debugging process.

Remote computer system 121 contains platform-independent virtual machine 122, which executes code modules 123–125. Platform-independent virtual machine 122 implements a security policy 127 which restricts access by code modules 123–125 to resources within remote computer system 121. In one embodiment of the present invention, code modules 123–125 include platform-independent JAVA byte codes, and platform-independent virtual machine 122 includes a JAVA VIRTUAL MACHINE (JVM) that executes the JAVA bytecodes. However, note that the present invention can apply to any type of code module (including source code and executable code) that can be downloaded onto remote computer system 121.

When remote computer system 121 fails, post-mortem information is stored in crash dump file 129 located on storage device 128. Storage device 128 can include any type of non-volatile storage device that can be coupled to a computer system. This includes, but is not limited to, magnetic, optical, and magneto-optical storage devices as well as storage devices based on flash memory and/or battery-backed up memory.

Process of Viewing Post-Mortem Information

Figure 2:
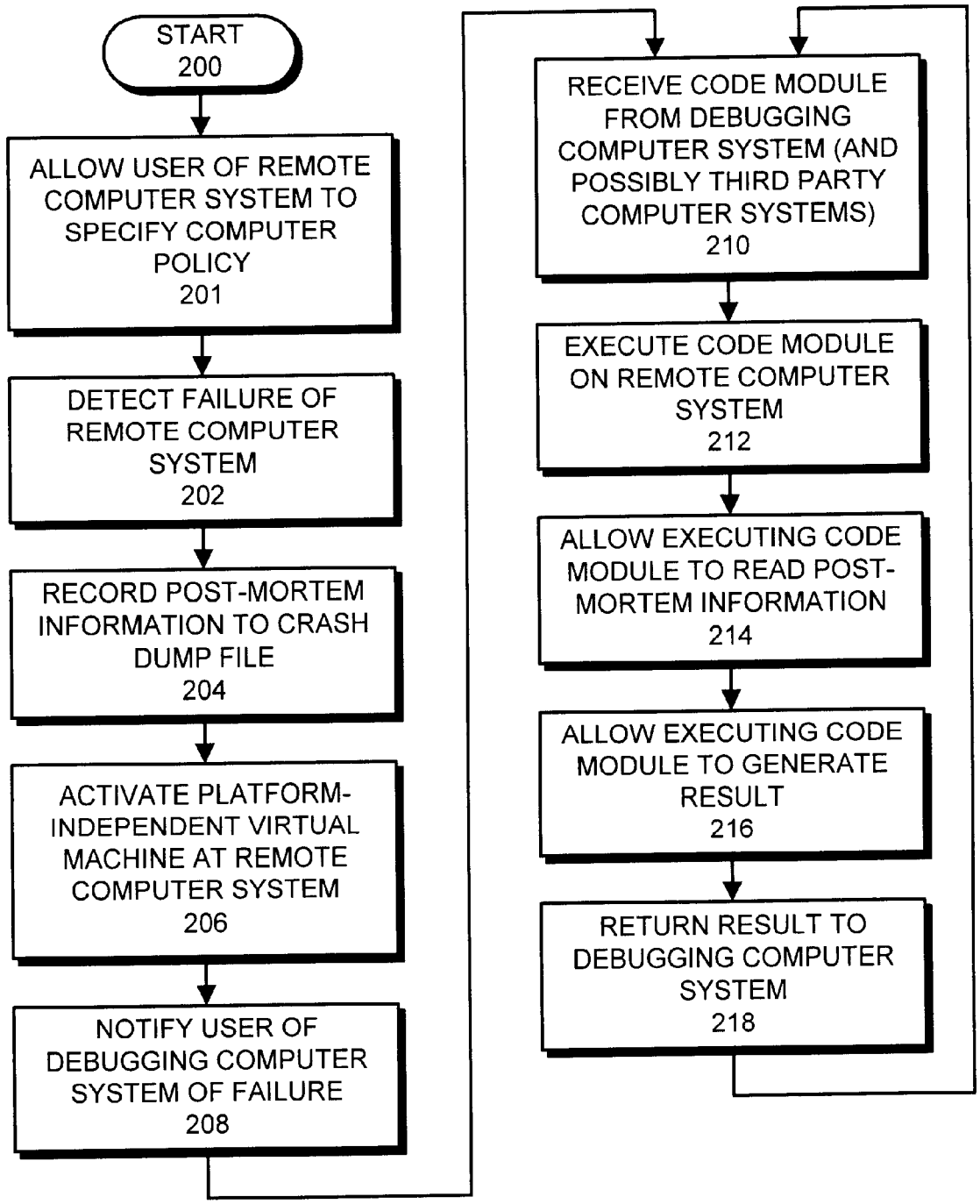
FIG. 2 is a flow chart illustrating the process of downloading a code module in order to view post-mortem information in accordance with an embodiment of the present invention.

FIG. 2 is a flow chart illustrating the process of downloading a code module in order to view post-mortem information in accordance with an embodiment of the present invention. The system starts by allowing a user of remote computer system 121 to specify a security policy 127 for executing code modules (step 201). In one embodiment of the present invention, security policy 127 is stored in a file on storage device 128.

Upon detecting a failure of remote computer system 121 (step 202), an exception condition is triggered. This exception condition causes remote computer system 121 to record post-mortem information in crash dump file 129 (step 204). The contents of crash dump file 129 is described in more detail below with reference to FIG. 4.

At this point, the system activates platform-independent virtual machine 122 within remote computer system 121, so that platform-independent virtual machine 122 is ready to receive a code module 123 from debugging computer system 101 (step 206). Next, the system notifies a user of debugging computer system 101 of the failure of remote computer system 121 (step 208). This notification process can take place automatically across network 108, or alternatively, may involve a telephone call to a user of debugging computer system 101.

Next, remote computer system 121 receives code module 123 from debugging computer system 101 (step 210). If third party components and/or software are involved, remote computer system may additionally receive third party code module 125 from third party computer system 111.

Next, remote computer system 121 executes code module 123 (and possibly third party code module 125) on platform-independent virtual machine 122 (step 212). As part of this execution process, the system verifies that security policy 127 is adhered to.

During this execution process, executing code module 123 is allowed to read post-mortem information from crash dump file 129 (step 214). This allows executing code module 123 to generate a result (step 216). This result is returned to debugging computer system 101 (step 218).

The system then returns to step 210 to repeat steps 210–218 with a subsequent code module that is received from debugging computer system 101. In this way, a user of debugging computer system 101 is able to investigate various failure possibilities by sending successive code modules to perform various investigative tasks, such as gathering specific pieces of information or simulating operation of certain components within remote computer system 121.

Security Policy

Figure 3:
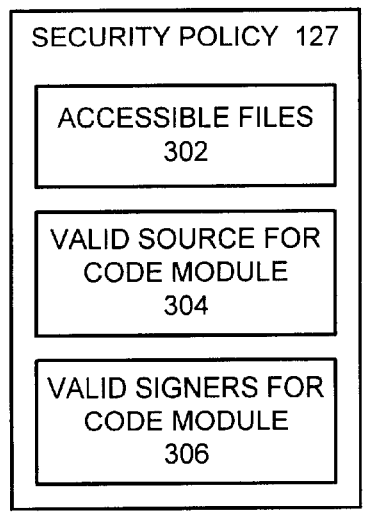
FIG. 3 illustrates a security policy in accordance with an embodiment of the present invention.

FIG. 3 illustrates a security policy 127 in accordance with an embodiment of the present invention. Security policy 127 can include any type of security restrictions involved in executing code modules 123–125 on remote computer system 121. This can include specifications for files 302 that are accessible by code modules 123–125. For example, the accessible files can include crash dump file 129. Note that the present invention can also write to a log file in order to record the actions of code modules 123–125.

Security policy 127 may also specify a valid source 304 for a code module. For example, a code module may only be accepted if it originates from a specific network address or from a specific network domain.

Security policy 127 may also specify a valid signer 306 for a code module. For example, suppose code module 123 has been digitally signed. In this case, a valid signer can either be the sender or a certifying authority for the sender. Note that recent implementations of JAVA virtual machines contain mechanisms that verify digital signatures on signed JAVA classes.

Crash Dump File

Figure 4:
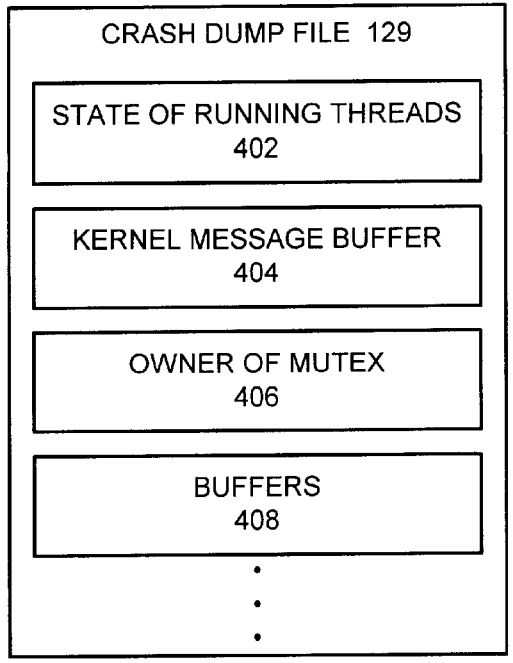
FIG. 4 illustrates the structure of a crash dump file in accordance with an embodiment of the present invention.

FIG. 4 illustrates the structure of a crash dump file 129 in accordance with an embodiment of the present invention. Crash dump file 129 can include the state of the running threads 402. Crash dump file 129 can also include the contents of the kernel message buffer 404. This allows messages that did not make it to the message file to be viewed. Crash dump file 129 can also include identifiers for owners of mutual exclusion variables 406 as well as identifiers for processes that are waiting on the mutual exclusion variables. Crash dump file 129 can also include the contents of memory buffers 408 that may be relevant to reconstructing the failure.

Example Viewing of Crash Dump File

Figure 5:
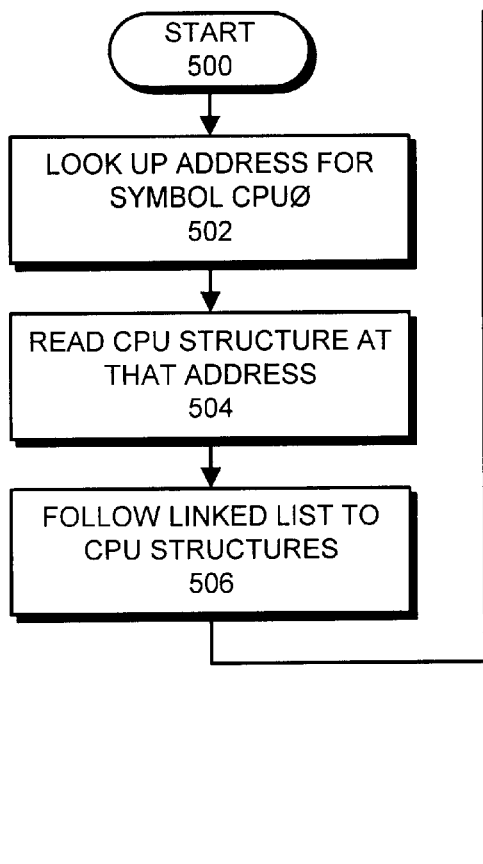
FIG. 5 is a flow chart illustrating an example of viewing portions of the crash dump file in accordance with an embodiment of the present invention.

FIG. 5 is a flow chart illustrating an example of viewing portions of the crash dump file in accordance with an embodiment of the present invention. This is an example of merely one of many possible debugging operations that can be performed by a code module 123.

During execution of code module 123, the system looks up an address for symbol CPU0 (step 502). The system reads a CPU (central processing unit) structure at this address (step 504), and then follows a linked list of CPU structures for each CPU within remote computer system 121 (step 506).

Next, for each CPU structure, the system reads a current thread field (step 508). This allows the system to go to the address specified in the current thread field in order to read a thread structure (step 510). From the thread structure, the system is able to retrieve stack information. Finally, the system returns the stack information to debugging computer system 101 (step 512). Note that the above process is repeated for each CPU. In this way, debugging computer system 101 is able to obtain stack information for all current threads on all CPUs within remote computer system 101.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for analyzing post-mortem information after a failure on a remote computer system that operates by downloading a code module that executes on the remote computer system, the method comprising:

receiving a code module sent from a debugging computer system at the remote computer system;

executing the code module at the remote computer system;

allowing the executing code module to read the post-mortem information from the remote computer system, the post-mortem information specifying a state of the remote computer system after the failure of the remote computer system;

allowing the executing code module to generate a result by analyzing the post-mortem information in order to determine a cause of the failure of the remote computer system; and returning the result generated by the executing code module to the debugging computer system.

2. The method of claim 1, wherein the post-mortem information includes a crash dump file specifying the state of the remote computer system after the failure of the remote computer system.

3. The method of claim 1, wherein the code module includes platform-independent JAVA byte codes, and wherein executing the code module involves executing the platform-independent JAVA byte codes on a JAVA virtual machine located on the remote computer system.

4. The method of claim 1, further comprising allowing a user of the remote computer system to specify a security policy for the executing code module.

5. The method of claim 4, wherein specifying the security policy includes at least one of:

specifying at least one file on the remote computer system that can be accessed by the executing code module; and specifying at least one valid source from which the code module can be accepted.

6. The method of claim 1, further comprising maintaining a log of actions performed by the executing code module.

7. The method of claim 1, wherein prior to receiving the code module and upon detecting the failure of the remote computer system, the method further comprises:

recording post-mortem information for the remote computer system; and notifying a user of the debugging computer system that the remote computer system has failed.

8. A method for analyzing post-mortem information after a failure on a remote computer system that operates by downloading a code module that executes on the remote computer system, the method comprising:

sending the code module from a debugging computer system to the remote computer system;

allowing the remote computer system to execute the code module;

wherein the executing code module reads the post-mortem information from the remote computer system, the post-mortem information specifying a state of the remote computer system after the failure of the remote computer system;

allowing the executing code module to generate a result by analyzing the post-mortem information in order to determine a cause of the failure of the remote computer system; and receiving the result generated by the executing code module at the debugging computer system.

9. A computer-readable storage medium storing instructions that when executed by a computer cause the computer to perform a method for analyzing post-mortem information after a failure on a remote computer system that operates by downloading a code module that executes on the remote computer system, the method comprising:

receiving a code module sent from a debugging computer system at the remote computer system;

executing the code module at the remote computer system;

allowing the executing code module to read the post-mortem information from the remote computer system, the post-mortem information specifying a state of the remote computer system after the failure of the remote computer system;

allowing the executing code module to generate a result by analyzing the post-mortem information in order to determine a cause of the failure of the remote computer system; and returning the result generated by the executing code module to the debugging computer system.

10. The computer-readable storage medium of claim 9, wherein the post-mortem information includes a crash dump file specifying the state of the remote computer system after the failure of the remote computer system.

11. The computer-readable storage medium of claim 9, wherein the code module includes platform-independent JAVA byte codes, and wherein executing the code module involves executing the platform-independent JAVA byte codes on a JAVA virtual machine located on the remote computer system.

12. The computer-readable storage medium of claim 9, wherein the method further comprises allowing a user of the remote computer system to specify a security policy for the executing code module.

13. The computer-readable storage medium of claim 12, wherein specifying the security policy includes at least one of:

specifying at least one file on the remote computer system that can be accessed by the executing code module; and specifying at least one valid source from which the code module can be accepted.

14. The computer-readable storage medium of claim 9, wherein the method further comprises maintaining a log of actions performed by the executing code module.

15. The computer-readable storage medium of claim 9, wherein prior to receiving the code module and upon detecting the failure of the remote computer system, the method further comprises:

recording post-mortem information for the remote computer system; and notifying a user of the debugging computer system that the remote computer system has failed.

16. A computer-readable storage medium storing instructions that when executed by a computer cause the computer to perform a method for analyzing post-mortem information after a failure on a remote computer system that operates by downloading a code module that executes on the remote computer system, the method comprising:

sending the code module from a debugging computer system to the remote computer system;

allowing the remote computer system to execute the code module;

wherein the executing code module reads the post-mortem information from the remote computer system, the post-mortem information specifying a state of the remote computer system after the failure of the remote computer system;

allowing the executing code module to generate a result by analyzing the post-mortem information in order to determine a cause of the failure of the remote computer system; and receiving the result generated by the executing code module at the debugging computer system.

17. An apparatus that analyzes post-mortem information after a failure on a remote computer system that operates by downloading a code module that executes on the remote computer system, the apparatus comprising:

a receiving mechanism, within the remote computer system, that receives a code module sent from a debugging computer system;

an execution mechanism, within the remote computer system, that executes the code module;

wherein the execution mechanism is configured to, allow the executing code module to read the post-mortem information from the remote computer system, the post-mortem information specifying a state of the remote computer system after the failure of the remote computer system, and to allow the executing code module to generate a result by analyzing the post-mortem information in order to determine a cause of the failure of the remote computer system; and a returning mechanism that returns the result generated by the executing code module to the debugging computer system.

18. The apparatus of claim 17, wherein the post-mortem information includes a crash dump file specifying the state of the remote computer system after the failure of the remote computer system.

19. The apparatus of claim 17, wherein the code module includes platform-independent JAVA byte codes, and wherein the execution mechanism is configured to execute the platform-independent JAVA byte codes on a JAVA virtual machine located on the remote computer system.

20. The apparatus of claim 17, further comprising a security configuration mechanism that is configured to allow a user of the remote computer system to specify a security policy for the executing code module.

21. The apparatus of claim 20, wherein the security configuration mechanism is configured to allow the user to:

specify at least one file on the remote computer system that can be accessed by the executing code module; and to specify at least one valid source from which the code module can be accepted.

22. The apparatus of claim 17, further comprising a logging mechanism that is configured to maintain a log of actions performed by the executing code module.

23. The apparatus of claim 17, further comprising a post-mortem recording mechanism that upon detecting the failure of the remote computer system is configured to:

record post-mortem information for the remote computer system; and to notify a user of the debugging computer system that the remote computer system has failed.

24. An apparatus for analyzing post-mortem information after a failure on a remote computer system that operates by downloading a code module that executes on the remote computer system, the apparatus comprising:

a sending mechanism that sends the code module from a debugging computer system to the remote computer system;

wherein the remote computer system executes the code module to generate a result by analyzing the post-mortem information in order to determine a cause of the failure of the remote computer system;

wherein the executing code module reads the post-mortem information from the remote computer system, the post-mortem information specifying a state of the remote computer system after the failure of the remote computer system; and a receiving mechanism that receives the result generated by the executing code module at the debugging computer system.

* * * * *